March 9, 1954     B. E. RICHERT     2,671,323
APPARATUS FOR COOLING WELL SURVEYING INSTRUMENTS
Filed March 15, 1951

INVENTOR.
BERNHARD E. RICHERT
BY

Patented Mar. 9, 1954

2,671,323

UNITED STATES PATENT OFFICE 2,671,323

APPARATUS FOR COOLING WELL SURVEYING INSTRUMENTS

Bernhard E. Richert, Beaumont, Tex., assignor to Sun Oil Company, Philadelphia, Pa., a corporation of New Jersey Application March 15, 1951, Serial No. 215,760

2 Claims. (Cl. 62—125)

This invention relates to apparatus for cooling well surveying instruments and, more particularly, to apparatus which may be included with a well surveying instrument within a protective casing when the instrument is lowered within a bore hole in order to cool the instrument.

Difficulty is frequently encountered in the operation of well surveying instruments within a bore hole as a result of relatively high temperatures existing within the bore hole when the operation of the instrument is dependent upon apparatus which is affected by heat such as, for example, photographic plates, batteries, chemicals and accurately fitted or aligned parts which, as a result of expansion occurring at elevated temperatures, fail to function properly as a result of misalignment.

Cooling apparatus to be suitable for application with instruments lowered into a bore hole must be compact in nature and, to a reasonable degree, self-controlled.

It is an object of the present invention to provide apparatus for cooling a well surveying instrument which may be placed within the protective casing containing the well surveying instrument.

It is a further object of this invention to provide cooling apparatus for a well surveying instrument which will serve effectively to cool any portion of that instrument as may be desired.

These and other objects of the invention will become apparent from the following description when read in conjunction with the accompanying drawing, in which.

Figure 1:
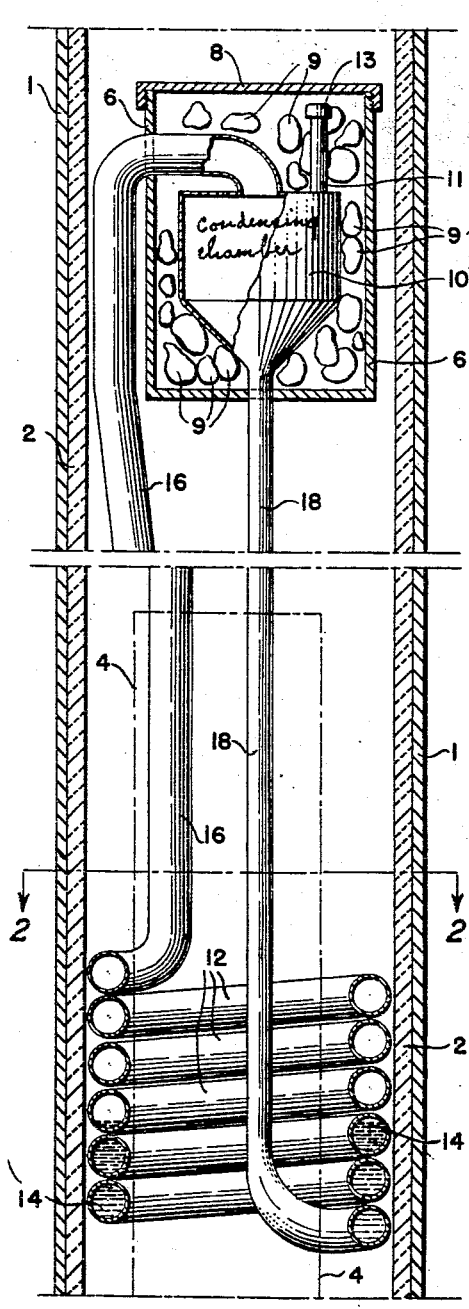
Figure 1 is an elevation in section showing a protective casing for a well surveying instrument within which is mounted one form of the present invention.
Figure 2:
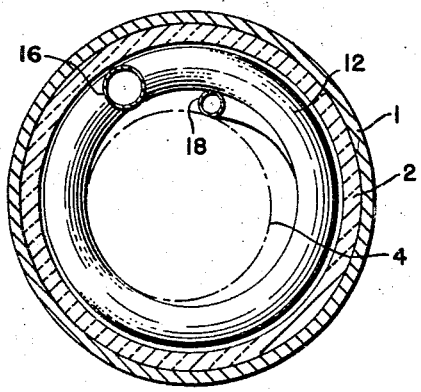
Figure 2 is a transverse section taken on the plane 2—2 of Figure 1.

Referring to Figures 1 and 2 there is shown a protective casing such as would normally house a well surveying instrument. Within the casing there is a heat insulating lining 2 surrounding a well surveying instrument, the outline of which is shown by construction lines 4. The insulating lining may extend a suitable distance above and below the cooling apparatus which is hereinafter described. As previously mentioned, the well surveying instrument may be any one of a variety of well surveying instruments well known in the art which would desirably have a portion thereof cooled. Within the insulating lining 2 and above the instrument 4 there is shown a cooling medium retainer 6 having a cover 8, the retainer being adapted to contain a suitable cooling material indicated at 9. This material could be an endothermally reacting chemical mixture, a fusing solid, such as ice or a frozen liquid, or a material such as solid carbon dioxide and a carbon dioxide gas absorbing chemical. If this latter cooling medium were used, a separate vessel connected to the retainer 6 would desirably be provided for retaining the carbon dioxide gas absorbing chemical. These and other cooling media such as are well known to the cooling art may be employed within the cooling medium retainer 6.

Mounted within the cooling medium retainer is the condensing chamber 10. Surrounding a portion of the well surveying instrument 4 are the coils 12. The coils are filled for a portion of their depth with a suitable liquid 14. This liquid may be any liquid which will boil at the temperatures involved, and may be selected to have a boiling point such as to control a temperature of the portion of the well surveying apparatus adjacent thereto at any predetermined value. This liquid may be, by way of example, acetone, ether, chloroform, benzene or one of the lower boiling alcohols. The upper portion of the coil 12 is connected by means of the tube 16 to the condensing chamber 10. The lower portion of the coil 12 is connected to the lower portion of the condensing chamber 10 by means of the tube 18.

Heat from the surveying instrument passing through the walls of the coil 12 will heat the liquid 14 causing it to boil. The vapors rising from the boiling liquid will pass through line 16 into the condensing chamber 10. The vapor will condense within the condensing chamber due to the reduced temperature of the chamber as will be maintained by the cooling medium within the retainer 6, the vapor giving up its heat to the cooling medium. The condensate forming in the condensing chamber 10 will pass downwardly through line 18 to the coils 12 wherein it will again pick up heat from the well surveying instrument. This cycle will provide an effective heat transfer between the well surveying instrument and the cooling medium in the retainer, the latent heat of vaporization being employed in this cycle, which includes a change of phase of the heat conveying material, to provide a heat transfer rate greatly in excess of that which could be accomplished by merely circulating a liquid in passages of similar size to those employed herein.

It will be apparent that, by selecting liquids of suitable boiling temperature, by varying the amount of liquid in the system and by selecting the cooling medium, the rate of cooling and the minimum temperature maintained by the cooling system may be established. In the form of the invention shown in Figure 1, the coil 12 may be disposed about the well surveying instrument at any desired location thereof in order to cool any desired portion of the apparatus.

The temperature of the cooling system may also be controlled by establishing the initial pressure within the system such as to give rise to a predetermined boiling temperature of the particular liquid employed. The tube 11 is connected to the condensing chamber 10 and is provided with a sealing cap 13. This tube is provided to permit changing of the liquid in the system and to provide means through which the pressure of the system may be adjusted.

Figure 3:
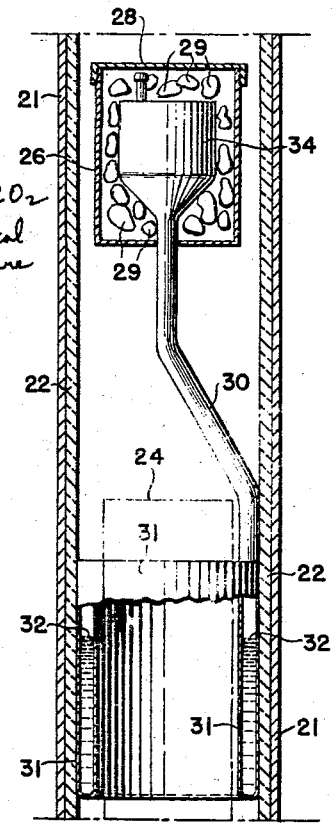
Figure 3 is an elevation partly in section showing an alternate form of the present invention.

In Figure 3 there is shown a modified form of the invention employing within a protective casing 21 and an insulating lining 22 a well surveying instrument shown in outline 24. Above the instrument there is mounted a cooling medium retainer 26 which is provided with a cover 28 and contains cooling medium 29. To this extent the apparatus in Figure 3 is identical to that shown in Figure 1.

In the form of the device shown in Figure 3 the boiler is in the form of an annular vessel 31, connected to the lower end of a tubular member 30, which contains in its lower portion a pool of liquid 32 which may be any suitable liquid such as previously described. Mounted within the cooling medium retainer is the condenser 34. The upper end of the tubular member 30 is connected to the lower portion of the condenser 34.

In this form of the invention the liquid 32 vaporizes, as a result of heat passing from the well surveying instrument 24, into the liquid and vapors rising from the liquid pass upwardly through the tube 30 into the condensing chamber 34 wherein the vapor condenses on the cooled walls of the condensing chamber and the condensate flows downwardly through the tube 30 into the pool of liquid 32 contained in the lower portion thereof. In this form of the invention, heat absorption from the adjacent portion of the well surveying instrument may be provided by the sublimation of a solid contained in the vessel 31.

It will be apparent that the form of the invention shown in Figure 1 may be modified by including in place of the coils 12 an annular container, such as is shown in Figure 3, to form the boiler to which the tubes 16 and 18 may be connected for communication with the condensing chamber.

By means of this device there is provided a simple and effective cooling apparatus which may be employed to cool substantially any desired portion of a well surveying instrument within a protective casing.

What is claimed is:

1. Apparatus adapted to pass downwardly into a bore hole, said apparatus comprising a casing, a heat insulating lining within said casing, a well surveying instrument mounted within said casing, a boiler disposed adjacent to the well surveying instrument and containing a liquid, the liquid in said boiler being heated by heat from the surveying instrument, a container positioned above said boiler and said instrument within said lining, a condensing chamber mounted within said container, a cooling medium within said container cooling said condensing chamber, and means for carrying vapor rising from the liquid in said boiler upwardly to said condensing chamber and for carrying condensate forming in said condensing chamber downwardly to said boiler.

2. Apparatus adapted to pass downwardly into a bore hole, said apparatus comprising a casing, a heat insulating lining within said casing, a well surveying instrument mounted within said casing, a generally annular boiler comprising a member surrounding a portion of the well surveying instrument and containing a liquid, the liquid in said boiler being heated by heat from the surveying instrument, a container positioned above said boiler and said instrument within said lining, a condensing chamber mounted within said container, a cooling medium within said container cooling said condensing chamber, and means for carrying vapor rising from the liquid in said boiler upwardly to said condensing chamber and for carrying condensate forming in said condensing chamber downwardly to said boiler.

BERNHARD E. RICHERT.

References Cited in the file of this patent

UNITED STATES PATENTS

| Number | Name | Date |
| --- | --- | --- |
| 1,843,026 | Hunt | Jan. 26, 1932 |
| 1,875,293 | Schlumbohm | Aug. 30, 1932 |
| 1,975,868 | Schlumbohm | Oct. 9, 1934 |
| 2,044,609 | Hedlund | June 16, 1936 |
| 2,324,103 | Miller | July 13, 1943 |